United States Patent
Tiwana et al.

(10) Patent No.: US 10,628,855 B2
(45) Date of Patent: Apr. 21, 2020

(54) AUTOMATICALLY MERGING MULTIPLE CONTENT ITEM QUEUES

(71) Applicant: Microsoft Technology Licensing, LLC, Redmond, WA (US)

(72) Inventors: Birjodh S. Tiwana, Dublin, CA (US); Jinyun Yan, Sunnyvale, CA (US); Shaunak Chatterjee, Sunnyvale, CA (US); Sarah Y. Xing, Sunnyvale, CA (US); Gaurav Chandalia, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 16/141,669

(22) Filed: Sep. 25, 2018

(65) Prior Publication Data

US 2020/0099746 A1 Mar. 26, 2020

(51) Int. Cl.
*G06Q 30/02* (2012.01)
*H04L 29/08* (2006.01)

(52) U.S. Cl.
CPC ..... *G06Q 30/0267* (2013.01); *G06Q 30/0264* (2013.01); *H04L 67/1097* (2013.01); *H04L 67/20* (2013.01); *H04L 67/32* (2013.01); *H04L 67/327* (2013.01)

(58) Field of Classification Search
CPC ..... H04L 67/1097; H04L 67/20; H04L 67/32; H04L 67/327; H04L 63/0428; H04L 65/602; G06Q 30/0267; G06Q 30/0264; G06Q 30/0269; G06Q 30/0273; H04H 20/38; H04H 60/06; H04H 60/33; H04H 60/66
See application file for complete search history.

(56) References Cited

U.S. PATENT DOCUMENTS

| | | | | |
|---|---|---|---|---|
| 6,334,110 B1* | 12/2001 | Walter | ................... | G06Q 30/02 705/14.41 |
| 7,363,302 B2* | 4/2008 | Lester | ................... | G06Q 30/02 707/914 |
| 7,711,313 B2* | 5/2010 | Steelberg | ............... | H04H 20/14 455/2.01 |
| 7,835,937 B1* | 11/2010 | Karlsson | ............ | G06Q 30/0202 705/7.31 |
| 8,090,613 B2* | 1/2012 | Kalb | ..................... | G06Q 30/02 705/14.1 |

(Continued)

*Primary Examiner* — Jimmy H Tran
(74) *Attorney, Agent, or Firm* — Hickman Palermo Becker Bingham LLP; Daniel D. Ledesma

(57) ABSTRACT

Techniques for automatically merging multiple content item queues are provided. In one technique, a first set of content items of a first type is identified. A second set of content items of a second type that is different than first type is identified. The first set of content items and the second set of content items are merged in a content item feed. Such merging involves, for a particular slot in the content item feed: determining a previous slot that contains a first content item from the first set; determining a number of slots between the previous slot and the particular slot; based on the number of slots, generating a score for a second content item from the second set; and based on the score, determining whether to insert, into the particular slot, the second content item or a third content item from the first set of content items.

20 Claims, 10 Drawing Sheets

(56) References Cited

U.S. PATENT DOCUMENTS

| | | | | |
|---|---|---|---|---|
| 8,099,327 B2* | 1/2012 | Steelberg | G06Q 30/0273 | 705/14.69 |
| 8,112,301 B2* | 2/2012 | Harvey | G06Q 10/0639 | 705/7.29 |
| 8,160,925 B2* | 4/2012 | Anand | G06Q 30/02 | 705/14.49 |
| 8,220,018 B2* | 7/2012 | de Andrade | H04N 21/8126 | 725/32 |
| 8,296,180 B1* | 10/2012 | Epperson | G06Q 30/0251 | 705/14.1 |
| 8,384,500 B2* | 2/2013 | Rofougaran | H01P 1/10 | 333/262 |
| 8,484,075 B1* | 7/2013 | Yan | G06Q 30/02 | 705/14.13 |
| 8,527,343 B1* | 9/2013 | Hubinette | G06Q 30/02 | 705/14.42 |
| 8,533,048 B2* | 9/2013 | Charania | G06Q 10/00 | 705/14.69 |
| 8,595,066 B1* | 11/2013 | Lamping | G06Q 30/02 | 705/14.41 |
| 8,620,748 B1* | 12/2013 | Ruarte | G06Q 30/02 | 705/14.41 |
| 8,744,908 B2* | 6/2014 | Kalb | G06Q 30/0244 | 705/14.41 |
| 8,799,062 B1* | 8/2014 | Epperson | G06Q 30/0269 | 705/14.1 |
| 8,949,340 B2* | 2/2015 | Smith | H04M 3/4878 | 709/206 |
| 9,037,515 B2* | 5/2015 | Gross | G06Q 30/0203 | 705/319 |
| 9,449,109 B1* | 9/2016 | Keel | G06F 16/9537 | |
| 9,589,048 B2* | 3/2017 | Milton | G06Q 30/0261 | |
| 9,754,279 B2* | 9/2017 | Ogawa | G06Q 30/0241 | |
| 9,870,344 B2* | 1/2018 | Filev | G06F 40/106 | |
| 9,886,700 B1* | 2/2018 | Allouche | G06Q 30/0251 | |
| 9,980,010 B2* | 5/2018 | Ray | H04N 21/252 | |
| 9,980,011 B2* | 5/2018 | Ray | G06Q 30/0251 | |
| 10,032,121 B2* | 7/2018 | Briggs | G06Q 10/06 | |
| 10,085,073 B2* | 9/2018 | Ray | G06Q 30/0275 | |
| 10,136,174 B2* | 11/2018 | Ray | G06Q 30/0272 | |
| 10,176,430 B2* | 1/2019 | Shankar | G11B 27/031 | |
| 10,212,489 B2* | 2/2019 | Bennett | H04N 21/812 | |
| 10,262,330 B2* | 4/2019 | Milton | G06F 16/9537 | |
| 10,318,973 B2* | 6/2019 | Milton | H04W 4/029 | |
| 10,319,046 B2* | 6/2019 | Doyle | G06Q 30/0269 | |
| 10,402,853 B1* | 9/2019 | Tsemekhman | G06Q 30/0249 | |
| 10,423,973 B2* | 9/2019 | Milton | G06Q 30/02 | |
| 10,453,100 B2* | 10/2019 | Thakkar | G06Q 30/0275 | |
| 10,497,010 B1* | 12/2019 | Zhang | G06Q 30/02 | |
| 10,504,153 B2* | 12/2019 | Patel | G06Q 30/0207 | |
| 10,510,043 B2* | 12/2019 | Gerace | G06F 16/9535 | |
| 2005/0021396 A1* | 1/2005 | Pearch | G06Q 30/02 | 705/14.41 |
| 2005/0265396 A1* | 12/2005 | Steelberg | G06Q 30/02 | 370/486 |
| 2005/0266834 A1* | 12/2005 | Steelberg | H04H 20/14 | 455/414.1 |
| 2005/0273835 A1* | 12/2005 | Steelberg | H04H 20/14 | 725/118 |
| 2005/0278736 A1* | 12/2005 | Steelberg | H04H 20/12 | 725/34 |
| 2005/0278746 A1* | 12/2005 | Steelberg | H04H 20/106 | 725/58 |
| 2006/0080171 A1* | 4/2006 | Jardins | G06Q 10/087 | 705/14.68 |
| 2006/0212409 A1* | 9/2006 | Steelberg | G06Q 30/0283 | 705/400 |
| 2006/0212916 A1* | 9/2006 | Steelberg | G06Q 30/02 | 725/93 |
| 2007/0027760 A1* | 2/2007 | Collins | G06Q 30/02 | 705/14.54 |
| 2007/0027762 A1* | 2/2007 | Collins | G06Q 30/0273 | 705/14.58 |
| 2007/0027771 A1* | 2/2007 | Collins | G06Q 10/0631 | 705/14.48 |
| 2007/0130009 A1* | 6/2007 | Steelberg | H04L 67/327 | 705/14.46 |
| 2007/0162926 A1* | 7/2007 | Steelberg | G06Q 10/087 | 725/34 |
| 2007/0233565 A1* | 10/2007 | Herzog | G06Q 30/02 | 705/14.41 |
| 2008/0021791 A1* | 1/2008 | Steelberg | G06Q 30/0267 | 705/14.68 |
| 2008/0097854 A1* | 4/2008 | Young | G06Q 30/02 | 705/14.43 |
| 2008/0140508 A1* | 6/2008 | Anand | G06Q 30/02 | 705/14.43 |
| 2008/0167957 A1* | 7/2008 | Steelberg | G06Q 30/02 | 705/14.64 |
| 2008/0249855 A1* | 10/2008 | Collins | G06Q 30/00 | 705/14.54 |
| 2008/0270164 A1* | 10/2008 | Kidder | G06Q 30/02 | 705/14.4 |
| 2008/0270238 A1* | 10/2008 | Zweben | G06Q 30/02 | 705/14.73 |
| 2008/0300894 A1* | 12/2008 | John | G06Q 30/02 | 705/1.1 |
| 2009/0006145 A1* | 1/2009 | Duggal | G06Q 10/025 | 705/6 |
| 2009/0030784 A1* | 1/2009 | Goyal | G06Q 30/02 | 705/14.43 |
| 2009/0030785 A1* | 1/2009 | Goyal | G06Q 30/00 | 705/14.1 |
| 2009/0037267 A1* | 2/2009 | Duggal | G06Q 30/02 | 705/14.48 |
| 2009/0138337 A1* | 5/2009 | Moukas | G06Q 10/0631 | 705/7.12 |
| 2009/0228338 A1* | 9/2009 | Brandman | G06Q 10/06375 | 705/7.37 |
| 2009/0248478 A1* | 10/2009 | Duggal | G06Q 30/02 | 705/14.42 |
| 2009/0259518 A1* | 10/2009 | Harvey | G06Q 10/0639 | 705/7.29 |
| 2009/0292677 A1* | 11/2009 | Kim | G06F 16/958 | |
| 2009/0299998 A1* | 12/2009 | Kim | G06F 16/951 | |
| 2009/0313120 A1* | 12/2009 | Ketchum | G06Q 30/02 | 705/14.51 |
| 2009/0319365 A1* | 12/2009 | Waggoner | G06Q 30/02 | 705/14.41 |
| 2010/0005001 A1* | 1/2010 | Aizen | G06Q 30/02 | 705/14.73 |
| 2010/0064338 A1* | 3/2010 | Steelberg | G06Q 30/02 | 725/119 |
| 2010/0082424 A1* | 4/2010 | Yerneni | G06Q 30/02 | 705/14.43 |
| 2010/0161492 A1* | 6/2010 | Harvey | G06Q 10/0639 | 705/50 |
| 2010/0217665 A1* | 8/2010 | Sharma | G06Q 30/02 | 705/14.45 |
| 2010/0274644 A1* | 10/2010 | Steelberg | G06Q 30/02 | 705/14.4 |
| 2010/0306249 A1* | 12/2010 | Hill | G06Q 30/02 | 707/769 |
| 2011/0029373 A1* | 2/2011 | Steelberg | G06Q 30/02 | 705/14.41 |
| 2011/0119125 A1* | 5/2011 | Javangula | G06Q 30/02 | 705/14.43 |
| 2011/0161162 A1* | 6/2011 | Ketchum | G06Q 30/02 | 705/14.43 |
| 2011/0225026 A1* | 9/2011 | Ketchum | G06Q 30/02 | 705/14.4 |
| 2012/0150635 A1* | 6/2012 | Raithatha | G06Q 30/0251 | 705/14.49 |
| 2012/0191529 A1* | 7/2012 | Lewis | G06Q 30/02 | 705/14.41 |
| 2012/0310728 A1* | 12/2012 | Kagan | G06Q 30/02 | 705/14.43 |
| 2012/0310729 A1* | 12/2012 | Dalto | G06Q 30/02 | 705/14.43 |

(56) References Cited

U.S. PATENT DOCUMENTS

| | | | |
|---|---|---|---|
| 2013/0013415 A1* | 1/2013 | Steelberg | H04L 67/327 705/14.64 |
| 2013/0046619 A1* | 2/2013 | Translateur | G06Q 30/02 705/14.46 |
| 2013/0080226 A1* | 3/2013 | Keith | G06Q 30/02 705/14.23 |
| 2013/0282476 A1* | 10/2013 | Peterson | G06Q 30/0241 705/14.41 |
| 2013/0282483 A1* | 10/2013 | Ruarte | G06Q 30/02 705/14.49 |
| 2013/0346199 A1* | 12/2013 | Brook | G06Q 30/0255 705/14.53 |
| 2014/0046777 A1* | 2/2014 | Markey | G06Q 30/0269 705/14.66 |
| 2014/0074627 A1* | 3/2014 | Kucharz | G06Q 30/02 705/14.72 |
| 2014/0100945 A1* | 4/2014 | Kitts | G06Q 30/0243 705/14.42 |
| 2014/0100947 A1* | 4/2014 | Kitts | G06Q 30/0201 705/14.45 |
| 2014/0101685 A1* | 4/2014 | Kitts | H04N 21/44213 725/14 |
| 2014/0101686 A1* | 4/2014 | Kitts | H04N 21/812 725/14 |
| 2014/0196062 A1* | 7/2014 | Emans | H04N 21/812 725/1 |
| 2014/0278916 A1* | 9/2014 | Nukala | G06Q 30/0243 705/14.42 |
| 2014/0279037 A1* | 9/2014 | Zimmerman | G06Q 30/0256 705/14.66 |
| 2014/0279074 A1* | 9/2014 | Chen | G06Q 30/0201 705/14.73 |
| 2014/0297400 A1* | 10/2014 | Sandholm | G06Q 30/0243 705/14.42 |
| 2014/0304654 A1* | 10/2014 | Gross | G06F 3/0482 715/811 |
| 2014/0337120 A1* | 11/2014 | Ercanbrack | G06Q 30/0244 705/14.43 |
| 2014/0337121 A1* | 11/2014 | Brandman | G06Q 30/0245 705/14.44 |
| 2014/0358667 A1* | 12/2014 | Beltramo, Jr. | G06Q 30/0243 705/14.42 |
| 2014/0372227 A1* | 12/2014 | Gausebeck | G06Q 30/02 705/14.66 |
| 2015/0032541 A1* | 1/2015 | Haddad | G06Q 30/0259 705/14.57 |
| 2015/0032549 A1* | 1/2015 | Steelberg | H04H 20/14 705/14.66 |
| 2015/0046251 A1* | 2/2015 | Smith | G06F 16/41 705/14.41 |
| 2015/0066628 A1* | 3/2015 | Ghosh | G06Q 30/02 705/14.43 |
| 2015/0106190 A1* | 4/2015 | Wang | G06Q 30/0244 705/14.43 |
| 2015/0227982 A1* | 8/2015 | Soupliotis | G06Q 30/0244 705/14.43 |
| 2015/0269606 A1* | 9/2015 | Hewett | G06Q 30/0243 705/14.42 |
| 2015/0324865 A1* | 11/2015 | Illowsky | G06Q 30/02 705/14.72 |
| 2016/0063574 A1* | 3/2016 | You | G06Q 30/0275 705/14.71 |
| 2016/0098751 A1* | 4/2016 | Zimmerman, Jr. | G06Q 30/0256 705/14.54 |
| 2016/0125456 A1* | 5/2016 | Wu | G06Q 30/0251 705/14.49 |
| 2016/0132926 A1* | 5/2016 | Zimmerman, Jr. | G06Q 30/0255 705/14.53 |
| 2016/0171509 A1* | 6/2016 | Fanous | G06F 16/9535 705/7.29 |
| 2016/0180375 A1* | 6/2016 | Rose | G06Q 30/0244 705/14.43 |
| 2016/0189217 A1* | 6/2016 | Burgess | G06Q 30/02 705/14.53 |
| 2017/0004539 A1* | 1/2017 | Jackson | G06Q 30/0269 |
| 2017/0024762 A1* | 1/2017 | Swaminathan | G06Q 30/0251 |
| 2017/0034593 A1* | 2/2017 | Ray | H04N 21/2543 |
| 2017/0091828 A1* | 3/2017 | Siegler | G06Q 30/0275 |
| 2017/0193546 A1* | 7/2017 | Bennett | G06Q 30/0244 |
| 2017/0208370 A1* | 7/2017 | Ray | H04N 21/812 |
| 2017/0213235 A1* | 7/2017 | Laufenberg | G06F 3/0481 |
| 2017/0262899 A1* | 9/2017 | Geraghty | G06Q 30/0275 |
| 2017/0347160 A1* | 11/2017 | Emans | H04N 21/251 |
| 2018/0012137 A1* | 1/2018 | Wright | G05B 13/0265 |
| 2018/0025303 A1* | 1/2018 | Janz | G06Q 10/0639 705/2 |
| 2018/0040011 A1* | 2/2018 | Milton | G06Q 30/02 |
| 2018/0047048 A1* | 2/2018 | Mielechowicz | G06Q 30/0243 |
| 2018/0114238 A1* | 4/2018 | Treiser | G06Q 50/01 |
| 2018/0225718 A1* | 8/2018 | Mohamed | G06Q 30/0269 |
| 2018/0351888 A1* | 12/2018 | Howard | H04L 51/046 |
| 2019/0014390 A1* | 1/2019 | Holtz | G06Q 30/0269 |
| 2019/0026786 A1* | 1/2019 | Khoury | G06Q 30/0271 |
| 2019/0108545 A1* | 4/2019 | Green | G06Q 30/0248 |
| 2019/0228309 A1* | 7/2019 | Yu | G05B 13/0265 |
| 2019/0251593 A1* | 8/2019 | Allouche | G06Q 10/0639 |

* cited by examiner

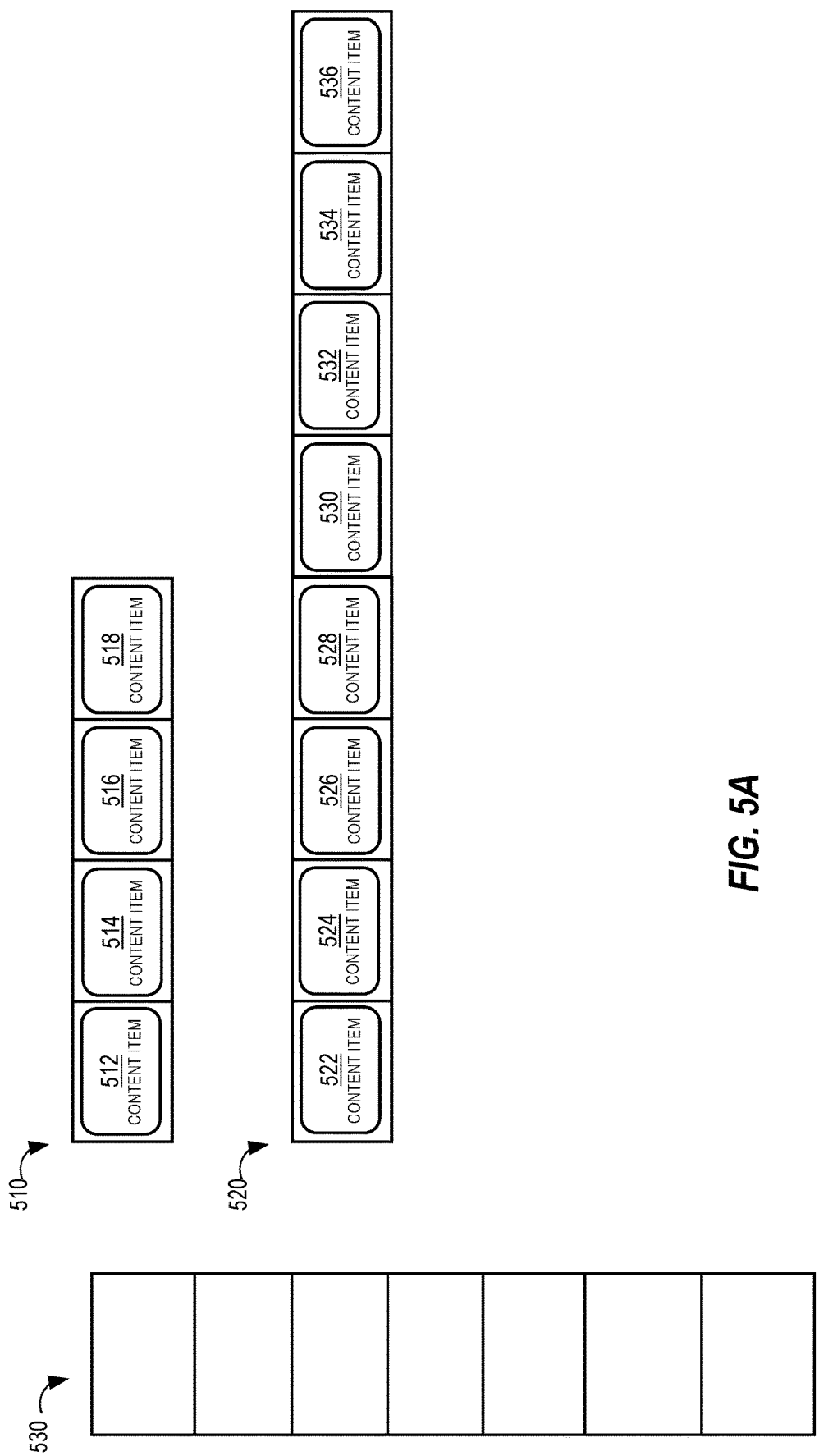

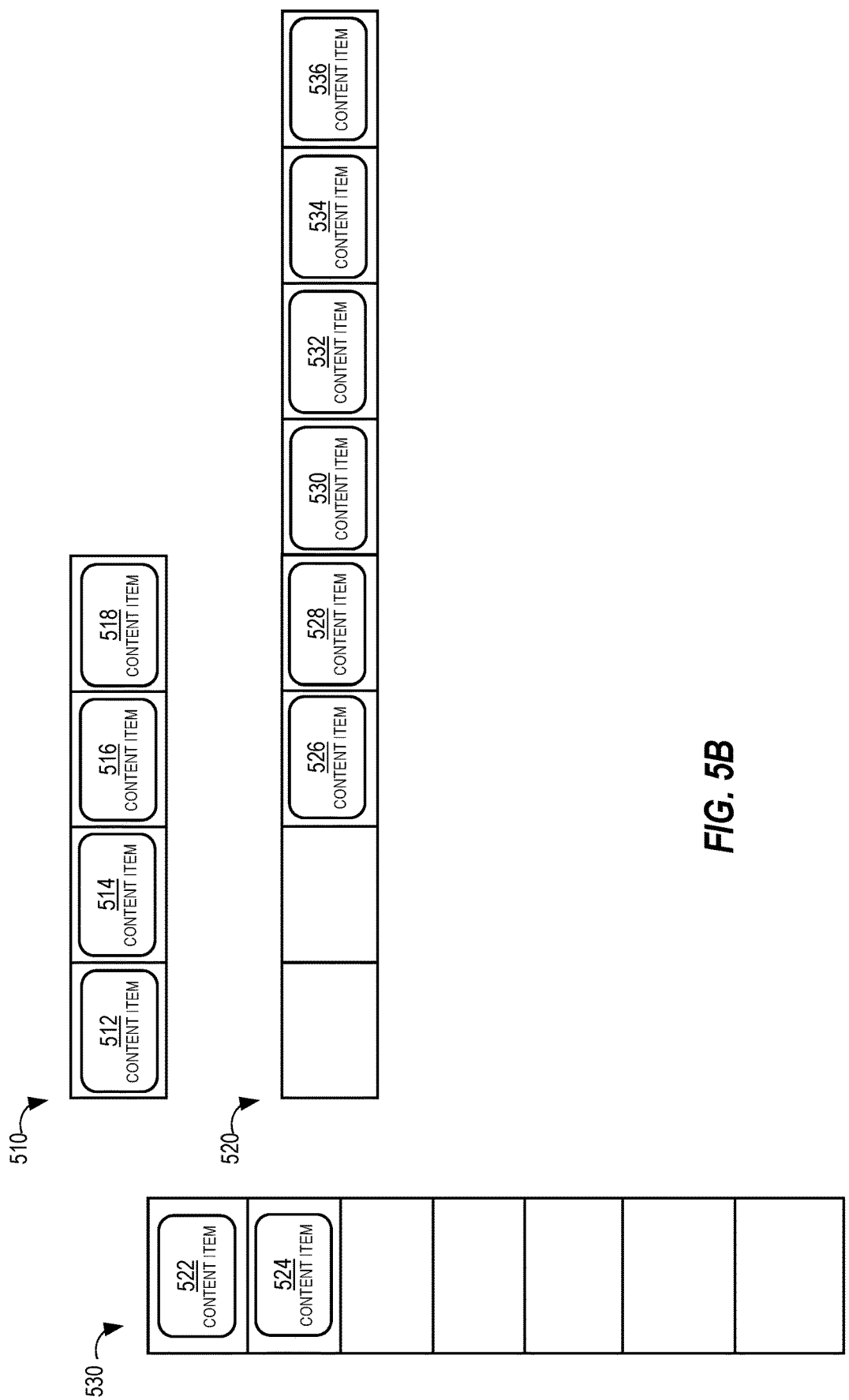

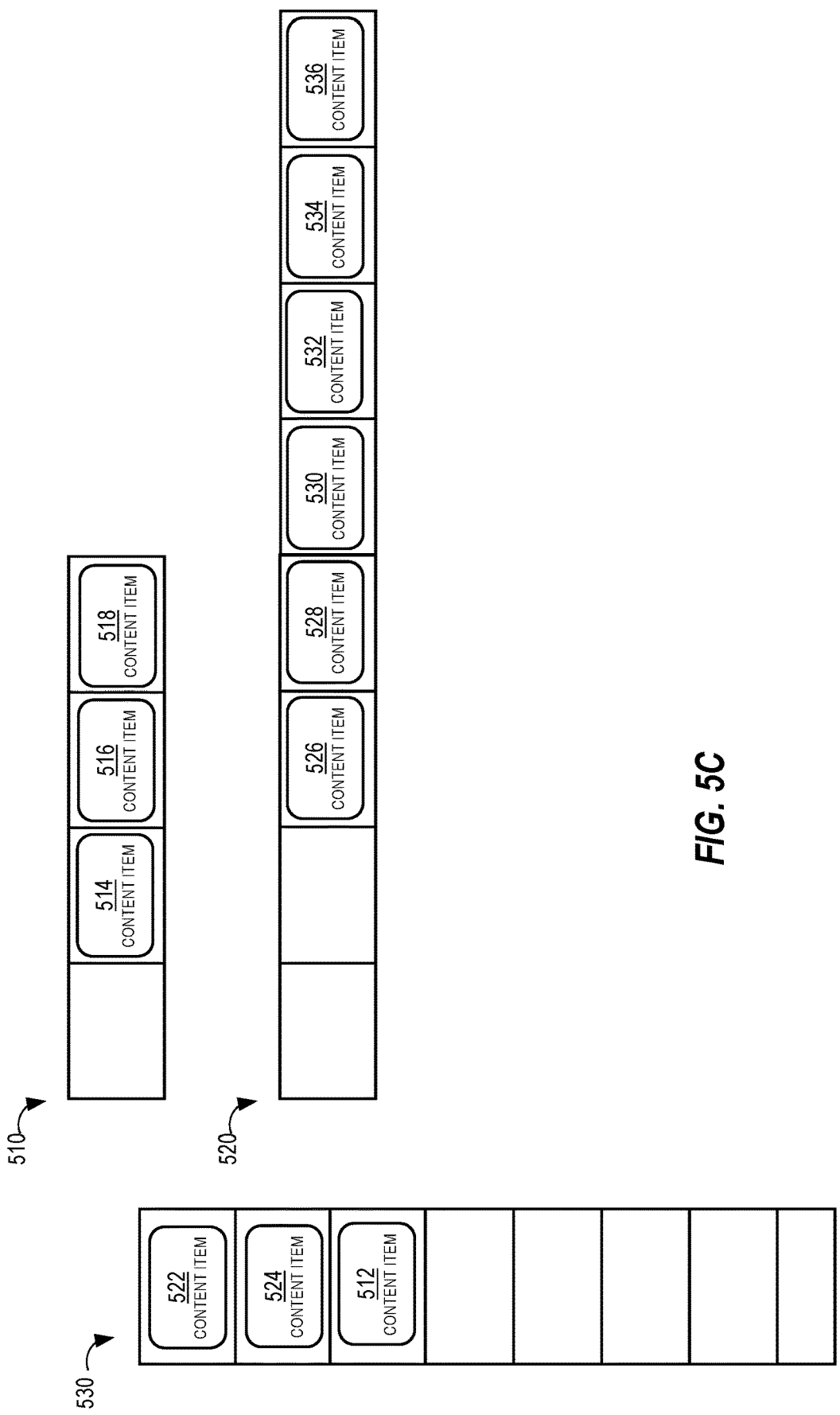

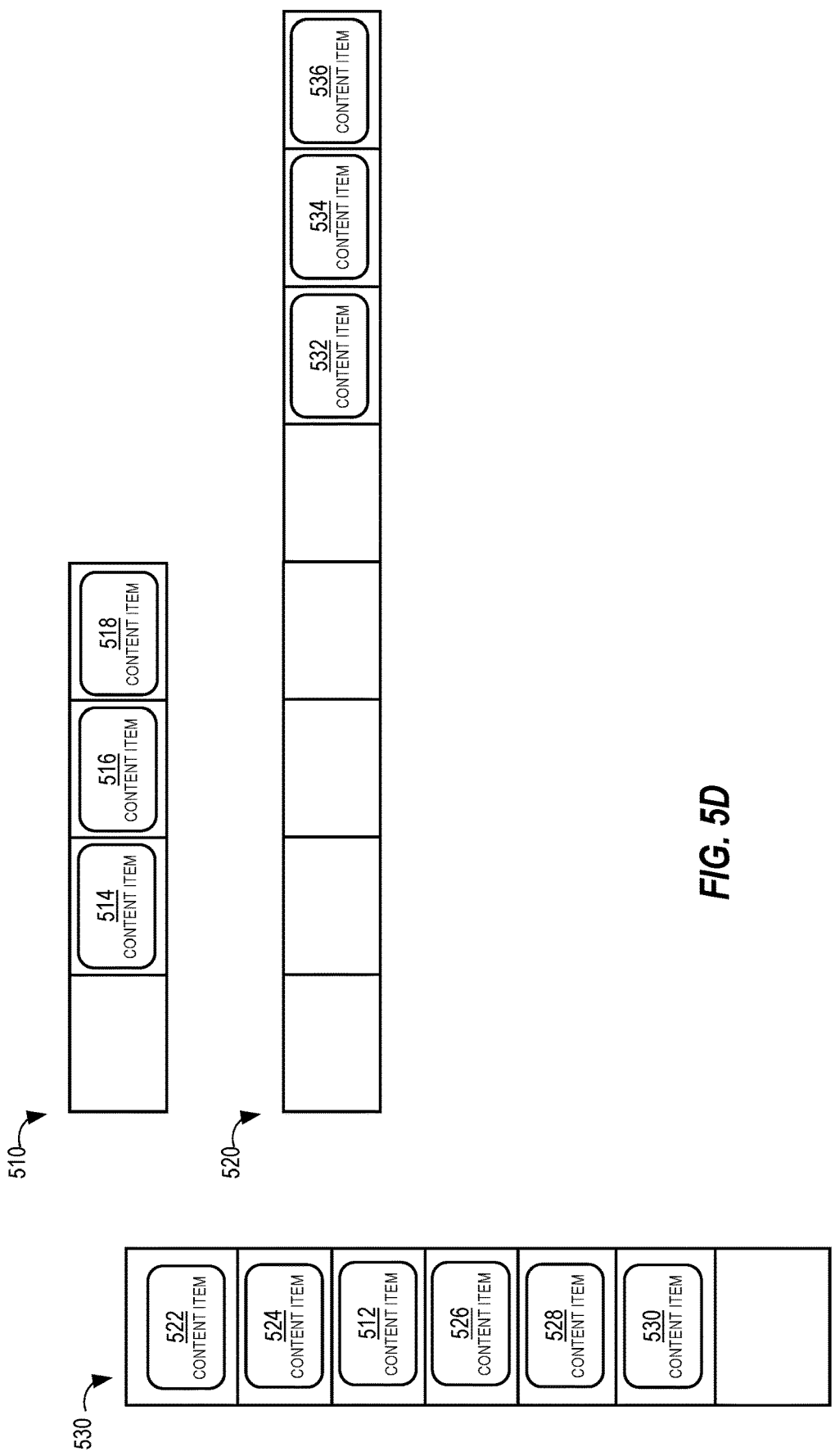

AUTOMATICALLY MERGING MULTIPLE CONTENT ITEM QUEUES

CROSS-REFERENCE TO RELATED APPLICATION

This application is related to U.S. application Ser. No. 16/141,642, filed Sep. 25, 2018 entitled "FEEDBACK BASED CONTROLLER FOR VARYING CONTENT ITEM DENSITY", the entire contents of which is hereby incorporated by reference as if fully set forth herein.

TECHNICAL FIELD

The present disclosure relates to content item distribution across a computer network and, more particularly to, merging queues of content items into a single feed while accounting for gaps in the feed.

BACKGROUND

The Internet has enabled the delivery of electronic content to billions of people. Some content providers desire to send additional content items to users who visit a website hosted by a third-party publisher system. To do so, content providers may rely on a content delivery service that delivers the additional content items to computing devices of such users. In one approach, a content provider provides, to the content delivery service, data that indicates one or more user attributes that users must satisfy in order to receive the additional content items. The content delivery service creates a content delivery campaign that includes the data and is intended for sending additional content items to computing devices of users who will visit the website. However, if too many content items of a particular type are displayed at one time, then users that are not interested in content items of that type will begin to ignore those content items completely and will be less likely to interact with those content items.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 5A-5E are block diagrams that depict two example queues and an example content item feed after the performance of different blocks of the above process, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for merging multiple content item queues into a single content item feed are provided. For each slot of multiple available slots of the content item feed, an engagement score is computed for a content item from each queue. The engagement score is based on a predicted user selection rate of each content item and a current distance between the next available slot and the slot containing a content item of a particular type. As the current distance increases, the more likely that a content item of the particular type will be selected. Thus, the slot distance between two consecutive content items of the particular type in a content item feed may vary from one pair of content items to another.

Embodiments described herein improve computer technology. Current approaches to including content items of the particular type in web content involve a minimum gap parameter that dictates a minimum distance in a content item feed between content items of the particular type. If high quality content items of the particular type are targeted to a user, then the user is likely to see content items of the particular type presented to her at this minimum gap. However, this minimum gap (since it is a global parameter) is restrictive when the relative quality of such content items is deemed high. Every user starts seeing such content items at this minimum gap, despite there being a large variance in quality, which should ideally result in different content item density for various members.

Embodiments result in increased user engagement and increased value of the content items. Furthermore, embodiments described herein involve at least a new technique of analyzing information, such as computing a shadow bid value that is based on a current gap distance and, thus, embodiments require an inventive set of methods.

System Overview

Figure 1:
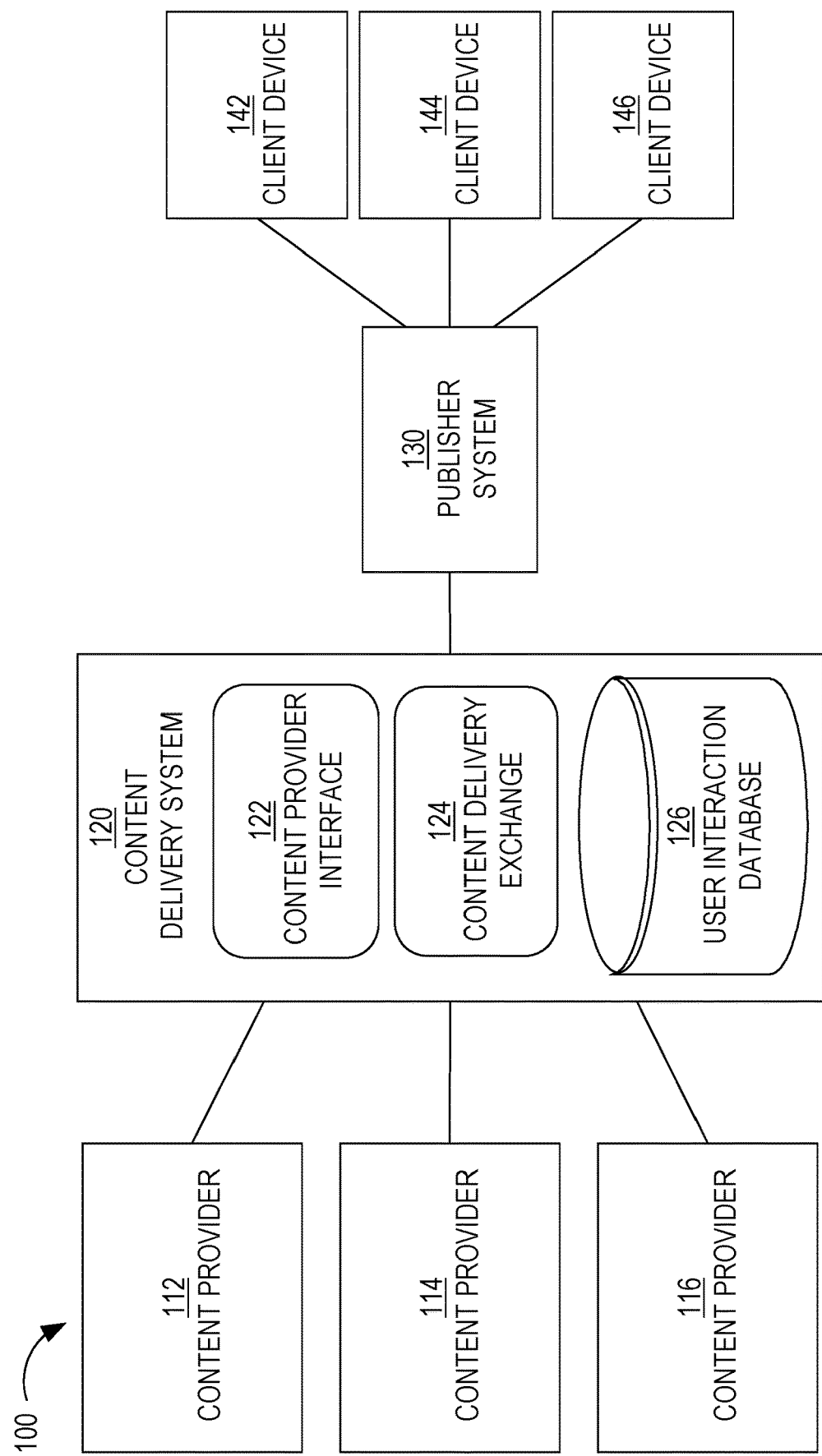
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item summaries, across client devices 152-156 (and other client devices not depicted). For example, content delivery system 120 determines whether a content item summary that content delivery exchange 124 delivers is presented at (e.g., displayed by or played back at) a client device. Such an "event" is referred to as an "impression." As another example, content delivery system 120 determines whether a content item summary that content delivery exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item summary. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item summary, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item summary, content delivery system 120 may calculate a CTR for the content item summary.

Content Item Feeds

A content item feed is a set of content items that is presented on a screen of a client device. A content item feed (or simply "feed") includes user interface controls for scrolling through the feed. A user interface control for receiving user input to scroll through a feed is referred to as a scroll element or "thumb." Content items within feed may be scrolled up and down or side to side. comprises. A feed may have a limited number of content items or may be an "infinite" feed where, as the feed is being scrolled through (whether automatically or in response to user input), additional content items (that have not yet been presented in the feed) are presented.

A content item feed contains multiple types of content items. One type of content item (referred to herein as the "first type") is one that has been created by one of content providers 112-116 and that is associated with a content delivery campaign having targeting criteria that are used to identify the user or client device that is presenting the content item. A content item of the first type is typically associated with a bid amount that a corresponding content provider is willing to pay for presentation of the content item. Thus, content items of the first type have revenue utility for content delivery system 120.

Another type of content item (referred to herein as the "second type") is content that is generated based on activity of users in an online network of the user that is viewing the content item. Examples of such a content item include a content item identifying an article authored by a friend or connection of the user in the online network, a content item identifying an article interacted with (e.g., selected, viewed, commented, liked, shared) by such a friend or connection, a content item identifying a change in a status of such a friend, a content item identifying news pertaining to an organization (e.g., company, academic institution, community organization) with which the user is associated or affiliated, or of which the user a member (e.g., as specified in the user's online social network). Such content items originate from content delivery system 120 and/or publisher system 130 and typically do not have (at least direct) revenue utility for content delivery system 120. Instead, content items of the second type have engagement utility for publisher system 130.

Another type of content item (referred to herein as the "third type") is a content item indicating a type of content in which content delivery system 120 (or an affiliated system) predicts the user might be interested. Examples of types of recommended content include people (i.e., potential friends/connections), jobs, and video courses. Such content items do not originate from content providers 112-116 and are not part of a content delivery campaign. However, the source of the jobs and the authors/providers of the video courses may be third-party entities relative to content delivery system 120 and/or publisher system 130. Such content items might not have (at least direct) revenue utility for content delivery exchange 120.

Ranking Content Items in a Feed

The number of content items that may be presented to a user in a content item feed may be practically limitless. Thus, to ensure user engagement and interest in the content item feed, content delivery system 120 (or publisher system 130) ranks the possible content items according to one or more ranking criteria. Example ranking criteria include actual user selection rate of a content item, predicted user selection rate of each content item, and value to content delivery system 120 or publisher system 130. The "value" may be a bid value that represents how much a content provider (e.g., content provider 112) will compensate content delivery exchange 120 for presenting the content item or if the user selects the content item. "Value" may correspond to another metric, such as a value to publisher system 130 if the content item is selected. Different types of content items (e.g., second type versus third type), different content items of the first type, and different sub-types of content items (e.g., job recommendations versus course recommendations) may be associated with different values.

Parameters for Placing Content Items of the First Type within a Feed

In an embodiment, content delivery system 120 or publisher system 130 ensures that content items of the first type are not presented too frequently within a single content item feed. Multiple parameters may be used to determine where and how often content items of the first type appear in a feed. One parameter is "minimum gap" whose value defines a minimum gap between two consecutive content items of the first type. For example, a minimum gap of four indicates that there must be at least four content items of the second type or third type between two content items of the first type. Another parameter is "top slot" whose value defines the highest position where content items of the first type can be shown in a content item feed. For example, if top slot is three, then the highest ranked content item of the first type may be placed in the third slot in the feed, but no higher.

Another parameter is "shadow bid." The value of shadow bid indicates a value of user engagement with publisher system 130. Shadow bid is a value for both content items of the first type (e.g., advertisements) and content items of other types, such as organic content items. In one approach, shadow bid is a constant value for all content items, regardless of type.

When determining whether to insert a content item of the first type or a content item of a second type in a slot of a content item feed, at least two content items are considered: (1) the top ranked content item from a first set of ordered set of content items of the first type and (2) the top ranked content item from a second set of ordered set of content items of the second type. If there are additional types and they are treated separately from each other, then there may be one or more other sets of content items of those types. Each slot represents an opportunity to raise revenue and/or increase engagement. While content items of the first type result in revenue if displayed or selected, content items of the second type generally do not result in revenue when displayed or selected. Those, for content items of the second type, their overall value comes in the form of the shadow bid and the probability of being selected (or otherwise interacted with).

In contrast, the probability of interacting with (e.g., selecting) content items of the first type may be much lower than the probability of interacting with content items of other types. Because shadow bid is combined with (e.g., multiplied by) the probability of user engagement, the higher the shadow bid, the more likely the overall value of a content item of a second type will exceed the value of a content item of the first type.

If shadow bid is the only one of these three parameters that is defined, then it would be possible that (a) very few or no content items of the first type would be presented in a content item feed or (b) the content item feed might almost entirely consist of content items of the first type. Either scenario is not ideal since the former (a) would result in little revenue and the latter (b) might result in user disengagement from publisher system 130 altogether.

Modifying Minimum Gap

In an embodiment, a first minimum gap value that is used to determine where to place content items in a first feed is modified based on performance data to generate a second minimum gap value. The performance data may correspond to one or more measurements of performance. Example measurements of performance include, user selection rate of content items of the first type, revenue generated from content items of the first type, and user engagement in content from publisher system 130, such as content items of the second and/or third type.

For example, if the user selection rate of content items of the first type increases, then the first minimum gap value decreases (or the second minimum gap value that is determined is less than the first minimum gap value). As another example, if the user selection rate of content items of the first type increases a particular amount (e.g., 10% from a previous measurement, 0.9% in absolute terms, or past a predefined threshold), then the first minimum gap value decreases. As another example, if user engagement decreases, then the first minimum gap value increases (or the second minimum gap value that is determined is greater than the first minimum gap value).

The change in a minimum gap value may be a fixed amount (e.g., +/−1 in minimum gap value) or may be a variable amount (e.g., sometimes +/−1 while other times +/−2). If the latter, the variable amount may be determined based on the extent to which the performance data changes from one time period to another. For example, if user selection rate decreases by at least X % (e.g., 30%) over the last day, then the minimum gap value increases by N (e.g., 3). As another example, if user engagement on a platform increases by Y amount (e.g., +100K) over three days, then the minimum gap value decreases by M (e.g., 2).

When the second minimum gap value is determined, the second minimum gap value may be used for future content item feeds. Thus, the space between consecutive content items of the first type will be based on the (new) second minimum gap value.

Example Process

Figure 2:
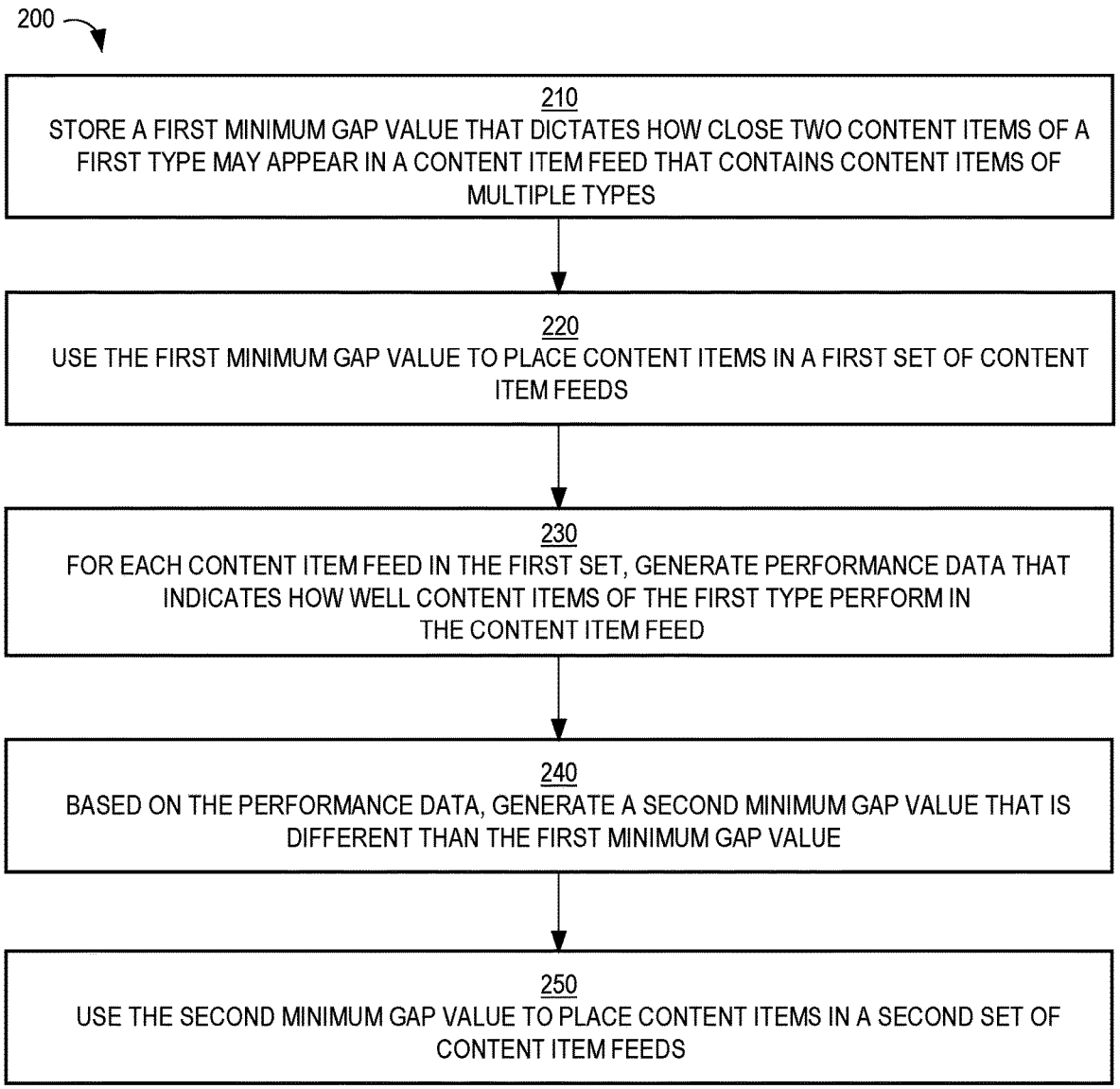
FIG. 2 is a flow diagram that depicts an example process for adjusting a minimum gap value for content items of a particular type, in an embodiment.

FIG. 2 is a flow diagram that depicts an example process 200 for adjusting a minimum gap value for content items of the first type, in an embodiment.

At block 210, a first minimum gap value is stored that dictates how close two content items of a first type may appear in a content item feed that contains content items of multiple types.

At block 220, the first minimum gap value is used to place content items in a first set of content item feeds. Different feeds in the first set of content item feeds are associated with different users. Additionally or alternatively, at least two feeds in the first set of content item feeds are presented to the same user (e.g., at different times). Thus, minimum gap is a static parameter and the first minimum gap value is a fixed value for a period of time, during which the first minimum gap value remains unchanged for multiple content item feeds for multiple client devices/users.

At block 230, for each content item feed in the first set of content item feeds, performance data is generated that indicates how well content items of the first type perform in the content item feed. The performance data may be an average, median, or other percentile user selection rate.

At block 240, based on the performance data, a second minimum gap value is generated that can be different than the first minimum gap value. For example, if the performance data is above a first threshold, then the second minimum gap value is set to be lower than the first minimum gap value. Conversely, if the performance data is below a second threshold, then the second minimum gap value is set to be higher than the first minimum gap value. Thus, the minimum gap value becomes dynamic. If the performance data holds at a desired level or is within a certain range of values, then the second minimum gap value may be the same as the first minimum gap value.

At block 250, the second minimum gap value is used to place content items in a second set of content item feeds. The second set of content item feeds may be associated with the same user or set of users as the first set of content item feeds.

Controller-Based Framework for Modifying Minimum Gap

In an embodiment, a controller-based framework is used to modify a minimum gap value. An example of a type of controller in such a framework is a proportional-integral-derivative (PID) controller. A PID controller continuously calculates an error value as a difference between a target value and a measured (or current) value and applies a correction based on proportional, integral, and derivative terms. An example of accurate and responsive correction to a control function is cruise control on a vehicle. The PID controller restores a current speed to the desired or target speed in an optimal way by controlling the power output of the vehicle's engine.

Certain parameters of a PID controller are initialized at the beginning of the PID process. In an embodiment, parameters include a current user selection rate (or CTR) (e.g., $y_0$), a current revenue (e.g., $r_0$), and a current minimum gap value (e.g., $a_0=6$). Also, a target value (e.g., z) is defined as the current user selection rate multiplied by the summation of 1 plus a lift value (e.g., 0.05) (e.g., $z=y_0*(1+\text{lift})$). Also, an error parameter or variable is defined and, optionally, initialized to 0 (e.g., $e_0=0$).

Once these parameters are initialized, the following process may be performed continuously (e.g., while t=1 to T do):
  a. determine a current user selection rate and a current revenue (e.g., observer $y_t$, $r_t$))
  b. determine a current error value based on a difference between the target value and the current user selection rate (e.g., $e_t=z-y_t$)
  c. determine a proportional value as a proportional weight multiplied by the current error value (e.g., $P=Kp*e_t$)
  d. determine an integral value as a proportional weight multiplied by the current error value (e.g., $I=Ki*\int_{\tau=1} e_\tau$)
  e. determine a derivative value as a derivative weight multiplied by the current error value (e.g., $D=Kd*de/dt$)
  f. determine a control signal (e.g., $u_t$) that is based on the proportional value, integral value, and derivative value (e.g. $u_t=P+I+D$)
  g. determine a next minimum gap value (e.g., $a_{t+1}$) based on the control signal.

There are at least two ways to determine the next minimum gap value based on the control signal. Those ways are described in the next two sections below.

Constraint-on-Objective Technique

In an embodiment, a forecast of a user selection rate and of another objective is based on different possible values for the minimum gap value. The different possible values may be constrained to an absolute minimum gap value (e.g., 3) and/or an absolute maximum gap value (e.g., 9). An example of the other objective is revenue. The following description is based on this example objective, although other embodiments may involve a different objective.

A forecast of a user selection rate given a possible minimum gap value may be determined based on a history of user selection rates given that possible minimum gap value. The forecast may be calculated using a rule-based model or a machine-learned model that is trained based on multiple training instances, each labeled with a user selection rate and one of the features being a minimum gap value during the time corresponding to user interaction data that was used to calculate that user selection rate.

The forecast of a user selection rate given a possible minimum gap value can be learned by a time-series model or a regression model. For time-series models, the input is a sequence of user selection rates ordered by time (date), the prediction output is the future (e.g., next day or next t days) user selection rate(s). The prediction is mainly based on the pattern (e.g., trend, seasonality) of the user selection propensity under a given minimum gap. A regression model takes a list of features and assumes the prediction output is a function of the given list of features. By fitting the training data (previous observed data), the regression model estimates the function and predicts for future user selection rate. The features can include user profiles (e.g., industry, location), platforms (e.g., mobile or desktop), member behaviors on content items of a particular type (e.g., reflected in previous user selection rates), and other online activities on publisher system 130, such as whether the user recently applied to one or more jobs.

Similarly, a forecast of revenue (the other objective in this example) given a possible minimum gap value may be determined based on a history of revenue given that possible minimum gap value. The forecast may be calculated using a rule-based model or a machine-learned model that is trained based on multiple training instances, each labeled with a revenue amount and one of the features being a minimum gap value that immediately preceded that revenue amount. The same type of model and features for forecasting user selection rate may be used to forecast revenue.

After a forecast of user selection rate is made for a possible minimum gap value (e.g., $y_{t+1}(a)$), a delta value (e.g., $\delta$) is calculated for the possible minimum gap value, where the delta value (e.g., $\delta(a)$) is based on a difference between the forecasted user selection rate for that possible minimum gap value and a summation of the current user selection rate and the control signal (e.g., $\delta(a)=y_{t+1}(a)-(y_t+u_t)$).

Once a delta value is calculated for each possible minimum gap value, then the minimum gap value that results in the highest revenue subject to one or more conditions is returned and used as the next minimum gap value ($a_{t+1}=\mathrm{argmax}_a(r_{t+1})$ where $\delta(a) \geq 0$). An example of the one or more conditions is that the delta value is greater than a particular threshold (e.g., $\delta(a) \geq 0$), such as greater than or equal to 0, which ensures that the forecasted user selection rate is equal to or higher than the desired target. Out of all possible minimum gap values that satisfy $\delta(a) \geq 0$, the one with the highest revenue gain is selected.

This constraint-on-revenue technique assumes that the value in each action depends on whether the action can maximize revenue and reach the specified target.

Heuristic Assumption Technique

The heuristic assumption technique utilizes the observation that lower density of content items of the first type results in lower amount of another objective (e.g., revenue).

Thus, in an embodiment, the current minimum gap value is tuned step by step until the target objective (e.g., user selection rate) is achieved. For example:
  a. if the control signal is 0 (e.g., $u_t=0$), then the minimum gap value remains the same (e.g., $a_{t+1}=a_t$)
  b. if the control signal is greater than 0 (e.g., $u_t>0$), then the new/updated minimum gap value is set to be the minimum of (1) the current minimum gap value plus a pre-defined value (e.g., 1) and (2) an absolute maximum value for the minimum gap value (e.g., 9) (e.g., $a_{t+1}=\min(a_t+1, 9)$)
  c. if the control signal is less than 0 (e.g., $u_t<0$), then the new/updated minimum gap value is set to be the maximum of (1) the current minimum gap value minus a pre-defined value (e.g., 1) and (2) an absolute minimum value for the minimum gap value (e.g., 3) (e.g., $a_{t+1}=\max(a_t-1, 3)$)

Segment-Specific Minimum Gap Values

In an embodiment, a minimum gap value is determined for different users or segments of users. Thus, different content item feeds are associated with different minimum gap values.

A segment may be defined based on one or more criteria. For example, users that visit publisher system 130 every day are assigned to a first segment, users that visit publisher system 130 at least once per week but not daily are assigned to a second segment, users that visit publisher system 130 at least one per month but not weekly are assigned to a third segment, and users that visit publisher system 130 less frequently are assigned to a fourth segment.

As another example, users that have a user selection rate within a first range (e.g., greater than 5%) are assigned to a first segment, users that have a user selection rate within a second range (e.g., between 3% and 5%) are assigned to a second segment, users that have a user selection rate within a third range (e.g., between 1% and 3%) are assigned to a third segment, and users that have a user selection rate within a fourth range (e.g., less than 1%) are assigned to a fourth segment. Embodiments are not limited to the number of segments or how each segment is defined. However, is it important to define meaningful and stable segments. Minimum gap values can be control based on segment because it is assumed that, within one segment, users are very similar.

Offline Workflow

Figure 3:
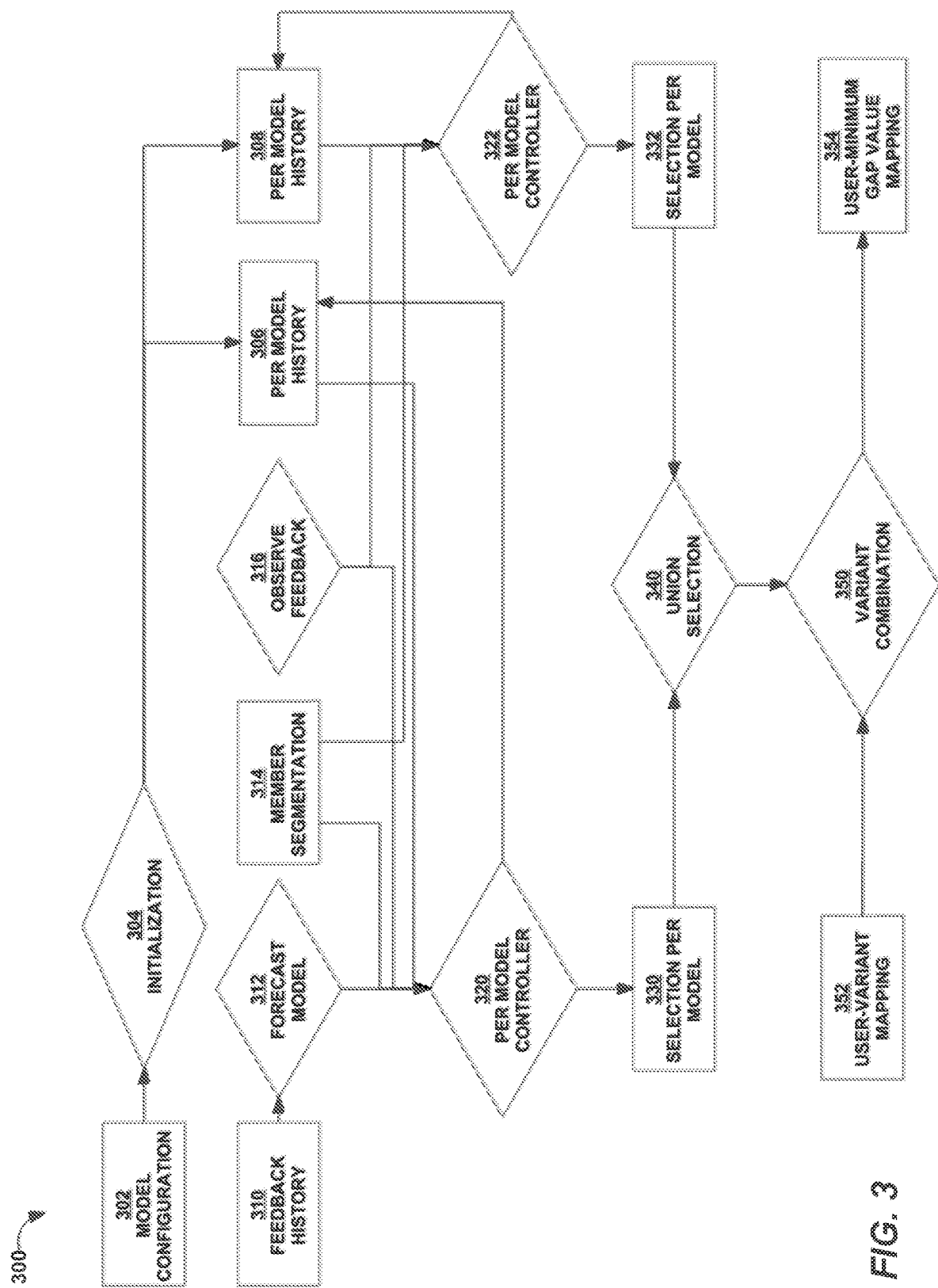
FIG. 3 is a block diagram that depicts an example workflow for updating minimum gap values using different techniques and for different segments, in an embodiment.

FIG. 3 is a block diagram that depicts an example workflow 300 for updating minimum gap values using different techniques and for different segments, in an embodiment. Workflow 300 may be implemented by content delivery system 120, publisher system 130, another computer system (not depicted in FIG. 1), or any combination thereof.

Each rectangular element in workflow 300 corresponds to data and each diamond element in workflow 300 corresponds to a process or a job.

Initialization 304 accepts, as input, model configuration 302 and generates, as output, an initial history for each model. Although only two models are depicted in workflow 300, workflow 300 may support multiple models/variants at the same time.

Model configuration 302 includes, for each model, model specifications, such as a model identifier, parameters (e.g., Kp, Ki, Kd, etc.), a target (e.g., for CTR), and a V-function (whether constraint on objective technique or heuristic assumption technique). V-function refers to "value function" and represents how good is a state for an agent to be in. The value function is equal to the expected total reward for the controller starting from each state (i.e., a minimum gap in this scenario).

Per-model history 306 includes history information about a particular model and each segment of multiple segments, a target for each segment, one or more past errors (e.g., $e_t$) for each segment (e.g., a difference between a target value and an actual value), and one or more past control signals (e.g., $u_t$) for each segment. Thus, different segments may be associated with different targets. Also, the target may change from time to time (such as where there is a business need), in which case the error (e.g., $e_t$) may be computed based on the new target. For example, the initial target may be a 2% lift in current revenue. Once it is achieved for a while, the target may be changed to a 1% lift in current revenue. Due to the seasonality in the system, different targets may be set in different quarters or other time periods. When the target changes, the error term is reset to 0.

Similarly, per-model history 308 includes history information about another model and each segment of multiple segments, a target for each segment, one or more past errors (e.g., $e_t$) for each segment, and one or more past control signals (e.g., $u_t$) for each segment. Thus, per-model history 306 corresponds to a first model and a per-model history 308 corresponds to a second model that is different than the first model. For example, the first model may be based on the constraint-on-objective technique while the second model may be based on the heuristic assumption technique.

Also, the segment definition for one model may be different than the segment definition for another model. For example, one model may have three segments while another model may have four segments. As another example, a segment for one model may be defined by the frequency of user activities on their respective content item feeds, while for another model, the segment is defined by geographic location of users.

Each per-model history is input to one of per-model controllers 320 and 322. Other inputs to per-model controller 320 include output from forecast model 312, member segmentation data 314, and observe feedback 316. Inputs to per-model controller 322 include member segmentation data 314 and observe feedback 316.

Forecast model 312 produces a forecast of a user selection rate for a segment given a possible minimum gap value and a forecast of a certain objective (e.g., revenue) for a segment given a possible minimum gap value. Input to forecast model 312 is feedback history 310, which includes the past N days of feedback (e.g., a user selection rate and revenue) per segment and an actual minimum gap value of that segment during a previous time period. For example, different time periods (e.g., days) may be different with different actual minimum gap values.

Member segmentation data 314 includes a user/member identifier-to-segment mapping that maps user/member identifiers to segments. Each user/member identifier is mapped to one or more segments. For a given segment definition, one user is mapped to a single segment. However, since there may be multiple models and each model has a segment definition, one user can be mapped to multiple segments.

A user is assigned to a segment based on one or more attributes or characteristics of the user. For example, online activity of a user is analyzed to determine to which segment the user is to be assigned. As another example, one or more profiles attributes of a user's profile are considered for assigning the user to a segment. A segment assignment may be based on a combination of online activity and user profile attributes. Multiple controllers/models may be experimented with at the same time by splitting users into multiple experimental buckets. For users in a given experimental bucket, those users will be "controlled" by a single controller/model at a time.

Observe feedback 316 determines current user selection rate for each segment and a current objective value (e.g., revenue amount) for each segment. Such information may be retrieved from another service or component, not depicted. Output of observe feedback 316 is input to per-model controllers 320 and 322.

In an embodiment, the feedback of interest is not limited to user selection rate and a single objective, such as revenue. Other feedback that may be considered include user selection rate to other types of content items (e.g., organic content items), user engaged session counts, length of user engaged sessions, etc. Such feedback may be added into the constrained optimization framework. One constrained optimization problem is formulated as follows:

maximize revenue, s.t. user selection rate to content items of the first type>=target.

If user engaged sessions are also monitored, then the formulation may change as follows:

maximize revenue, s.t. user selection rate to content items of the first type>=target; user engaged sessions>=threshold where threshold is the desired value for the user engaged sessions. There is still one target and the error terms for this target of which to keep track. The other feedback (user selection rate and user engaged sessions, in this example) is used for the constrained problem, not for controlling.

Per-model controllers 320 and 322 pertain to different models. Per-model controller 320 determines, for each segment, an updated minimum gap value based on the forecast (for that segment) produced by forecast model 312, member segmentation data 314, output from observe feedback 316, and per-model history 306. For example, per-model controller 320 implements the constraint-on-objective technique. The updated minimum gap value may be the same as or different than the most recent minimum gap value. The updated minimum gap value is used to update per-model history 306.

Per-model controller 320 stores the updated minimum gap value in selection per model 330. Thus, selection per model 330 includes a minimum gap value for each segment associated with the corresponding model.

Similarly, per-model controller 322 determines, for each segment, an updated minimum gap value based on member segmentation data 314, output from observe feedback 316, and per-model history 308. For example, per-model controller 322 implements the heuristic assumption technique. The updated minimum gap value for a segment may be the same as or different than the most recent minimum gap value for that segment. The updated minimum gap value is used to update per-model history 308.

Per-model controller 322 stores the updated minimum gap value in selection per model 332. Thus, selection per model 332 includes a minimum gap value for each segment associated with the corresponding model.

Union selection 340 unions or combines selection per models 330 and 332 and outputs the union to variant combination 350. Variant combination 350 accepts the union and a user-variant mapping 352 as input. User-variant mapping 352 maps each individual user to a variant. A variant is a specific experimental bucket, which contains a set of user/member identifiers. A variant is mapped to a specific model. Variant combination 350 generates, as output, a user/member-to-minimum gap value mapping 354 that maps different user/member identifiers to minimum gap values.

This mapping is used to update a minimum gap value attribute for each user/member. Later, when a user logs into a system (e.g., publisher system 130), publisher system 130 looks up attributes of the user, including a minimum gap value, and applies the minimum gap value when presenting content items of various types in a content item feed for the user.

Merging Content Item Queues into a Single Feed

Figure 4:
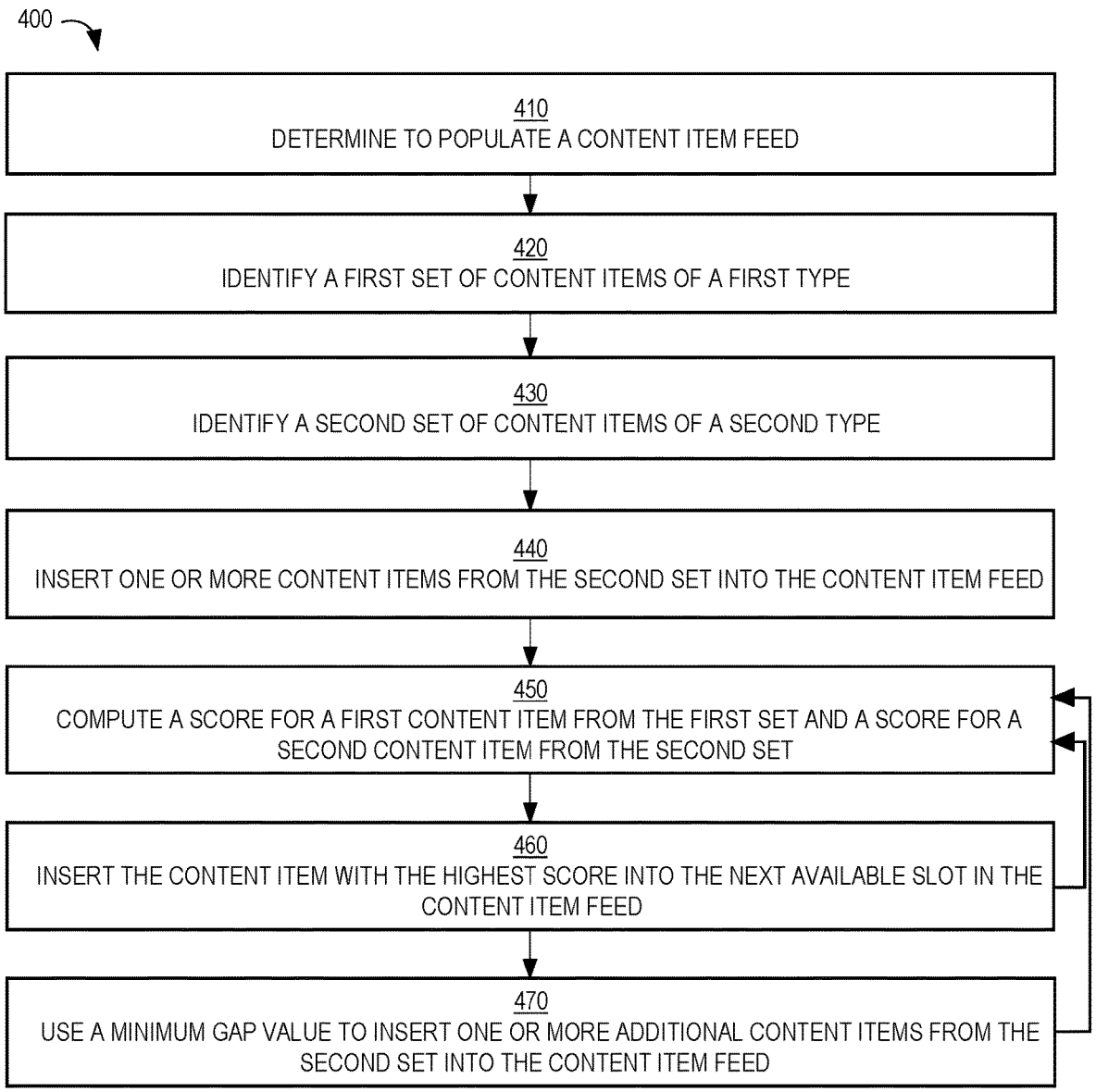
FIG. 4 is a flow diagram that depicts a process for merging content items from different queues into a single content item feed, in an embodiment.

FIG. 4 is a flow diagram that depicts a process 400 for inserting content items from different queues into a single content item feed, in an embodiment. Process 400 may be performed by content delivery system 120. Process 400 may be performed independent of process 200. In other words, the following description does not rely on modifying the minimum gap value from time to time. Instead, the minimum gap value may be fixed for long periods of time and, in one approach, only changed manually. Alternatively, the modifying the minimum gap value as described previously may be performed in conjunction with process 400 and the following description regarding the shadow bid value.

FIGS. 5A-5E are block diagrams that depict two example queues 510 and 520 and an example content item feed 530 after the performance of different blocks of process 400, in an embodiment. In this example, queue 510 contains content items of the first type and queue 520 contains content items of one or more other types. In other scenarios, more than two queues are merged into a single queue, but one of those queues contains content items of the first type and no other queue contains content items of the first type.

At block 410, a determination to populate a content item feed is made. Block 410 may involve receiving a (e.g., HTTP) request from a client device. The request may indicate a type of content that is associated with a feed or a URL associated with web page that is to include a feed. The request may include an identifier that is used to look up a unique identifier for a user that is operating the client device. Thus, the request may come from a logged in or registered user. Otherwise, the request may be presumed to come from a unregistered or non-logged in user.

At block 420, a first set of content items of the first type are identified. This set of content items is referred to herein as the "first queue." The first queue may be ordered (or ranked) based on one or more criteria. For example, the first queue may be ordered based on a bid associated with each content item, a probability of a user (or the specific user that initiated the request) interacting with (e.g., clicking) each content item, and/or a quality metric associated with each content item. For example, each content item in the first queue may be ordered based on the product of a bid amount associated with the content item and a predicted user selection rate of the content item. Some users may have a higher propensity to click on some content items versus other content items. Thus, the predicted user selection rate of some content items may be higher than the predicted user selection rate of other content items. If used, one or more quality metrics may be incorporated into a user selection prediction model that generates the predicted user selection rates. Thus, all else being equal, the higher the quality of a content item, the higher the predicted user selection rate of that content item.

The user selection prediction model may be a rules-based model where the coefficients of different features are manually tuned or a machine-learned model is trained where the coefficients of different features are automatically determined using one or more machine learning techniques, such as logistic regression, artificial neural networks using backpropagation, and gradient boosting. Example features of the prediction model may be classified as user features, content item features, context features, and cross user-content item features. Example user features include actual or observed user selection rate of the corresponding user, current and past job titles, current and past employers, job industry, job function, seniority of current job position, academic degrees earned, academic institutions attended, geographic location, number of connections, number of connections classified as influencers, etc. Example content item features include actual or observed user selection rate of the corresponding content item, identity of the content provider of the content item, features based on text within the content item, features based on an image or graphic within the content item. Example contextual features include time of day, day of week, operating system of device operated by the user, whether the application that initiated the content request is a web application or a dedicated (e.g., smartphone) application. Example cross user-content item features include the user's or the user segment's (to which the user is assigned) user selection rate with respect to content items from the same content provider as the current content provider of the corresponding content item, user-content provider affinity measured in terms of past interactions, user-content type affinity measured in terms of past interactions, and various permutations of all the features with each other.

At block 430, a second set of content items of the second type are identified. This set of content items is referred to herein as the "second queue." The second queue of content items may be ordered (or ranked) based on one or more criteria. For example, the second queue of content items may be ordered based on a probability of a user (or the specific user that initiated the request) interacting with (e.g., clicking) each content item and/or a quality metric associated with each content item. For example, each content item in the queue may be ordered based on a predicted user selection rate generated for each content item. Some users may have a higher propensity to click on some content items versus other content items. Thus, the predicted user selection rate of some content items may be higher than the predicted user selection rate of other content items.

The prediction model used to generate predicted user selection rates for content items of the second type may be different than the prediction model used to generate predicted user selection rates for content items of the first type. For example, the number and/or types of features may be very different.

FIG. 5A is a block diagram that depicts queues 510 and 520 and content item feed 530 prior to performance of block 440.

At block 440, one or more content items of the second type are inserted into one or more slots in the content item feed. The one or more content items are selected (and removed) from the second queue. (Removal may be actual removal or the one or more content items may be marked as already selected so that they are not considered again for insertion into the content item feed.) The selection may be from the highest ranked content item(s) in the second queue. The number of content items inserted in block 440 may depend on a top slot parameter that is set (or established). For example, if the top slot parameter is set to three, then the first two slots are filled with content items of the second type.

FIG. 5B is a block diagram that depicts queues 510 and 520 after two content items from queue 520 have been inserted into content item feed 530 and removed from queue 520.

At block 450, a first score of a first content item in the first queue is computed and a second score of a second content item in the second queue is computed. The first score is based on a shadow bid value, a predicted user selection rate of the first content item, and, optionally, a bid amount of the first content item. For example, the first score of the first content item=(shadow bid value*predicted user selection rate)+(bid amount*predicted user selection rate).

This score combines two different utilities: a revenue utility and an engagement/organic utility. Engagement/organic utility refers to the benefit that a user's engagement has on publisher system 130. A user's engagement with a content item is an indication that the user finds value in the content item. Accordingly, the user is more likely to engage with publisher system 130 in the future.

The second score is based on the shadow bid value and a predicted user selection rate of the second content item. For example, the second score of the second content item equals a shadow bid value multiplied by a predicted user selection rate of the second content item. Thus, the shadow bid value is the same for both the first content item and the second content item. The second score may be based on additional factors. For example, the second score may be based on a downstream network interaction model that takes into account what might happen in a user's social network if the user performed an action with respect to a content item in his/her feed. As a specific example, if the user to which the second content item has relatively many connections, then the value to publisher system 130 is greater than if the user has relatively few connections in the social network. This is because if the user interacts with the second content item (e.g., clicks, views, likes, shares, comments on), then many of the user's connections in the social network might be notified. Thus, the second score may be higher depending on the user to which the second content item is being presented. Also, if a user is considered "influential" in the sense that a relatively high percentage of the user's connections view, click, comment on, share or otherwise interact with content items that the user has posted or interacted with in the past, then a value from the downstream network interaction model will be higher, causing the second score for that user to be higher than if the user was not an influential connection.

As another example, a user's selection of content items of the second and other types are more likely to result in future downstream interactions by the user with other content provided/hosted by publisher system 130. In contrast, user selection of content items of the first type might result in the user being directed to a different website provided/hosted by a computer system different than publisher system 130. Thus, the likelihood of returning to publisher system 130 is less than if a content item of the second type was selected and, accordingly, the lower the engagement utility of content items of the first type.

The shadow bid value changes as the current gap (i.e., between the last (or most recent) slot in which a content item of the first type was inserted and the next available (or current) slot) changes. For example, the shadow bid value decreases as the current gap increases. Thus, if the current gap is relatively large, then the shadow bid value is relatively small. This means that it is more likely that a content item of the first type will be selected for insertion into the current slot. Techniques for calculating a shadow bid value are described in more detail below.

At block 460, the content item that is associated with the highest score is inserted into the next available slot in the content item feed and is removed from the corresponding queue. For example, if the first score is higher than the second score, then the first content item is inserted into the next available slot and is removed from the first queue. If the content item that is selected for insertion into the content item feed is of the first type, then process 400 returns to block 450. If the content item that is selected for insertion into the content item feed is of the second type, then process 400 proceeds to block 470.

FIG. 5C is a block diagram that depicts queues 510 and 520 after a content item from queue 510 has been inserted into content item feed 530 and removed from queue 510.

At block 470, a minimum gap value is used to insert zero or more content items of the second type in the next one or more available slots of the content item feed. For example, if the minimum gap value is three, then the next three slots are filled with content items from the second queue. The one or more content items that are inserted into the next available slots may be the next highest ranked content items in the second queue.

FIG. 5D is a block diagram that depicts queues 510 and 520 after three content items from queue 520 have been inserted into content item feed 530 and removed from queue 520.

During the first iteration of block 470, the current gap is a certain value (e.g., 0, 1, or 3). If the first content item (i.e., of the first type) is selected for insertion in the current slot, then the current gap value is reset to 0 and process 400 returns to block 450. If the second content item is selected for insertion in the current slot, then the current gap value increases by one. Whichever content item is selected, a pointer or reference to the current slot is incremented. For example, if the current slot at block 460 is slot 4, then, after block 470, the current slot becomes slot 7. Also, even if, for example, the first content item is selected, a new second score will be generated for the second content item in the next iteration of block 450 since the current gap will be different. Therefore, the second score used during one iteration of block 460 should not be used in the immediately subsequent iteration of block 460.

Figure 5E:
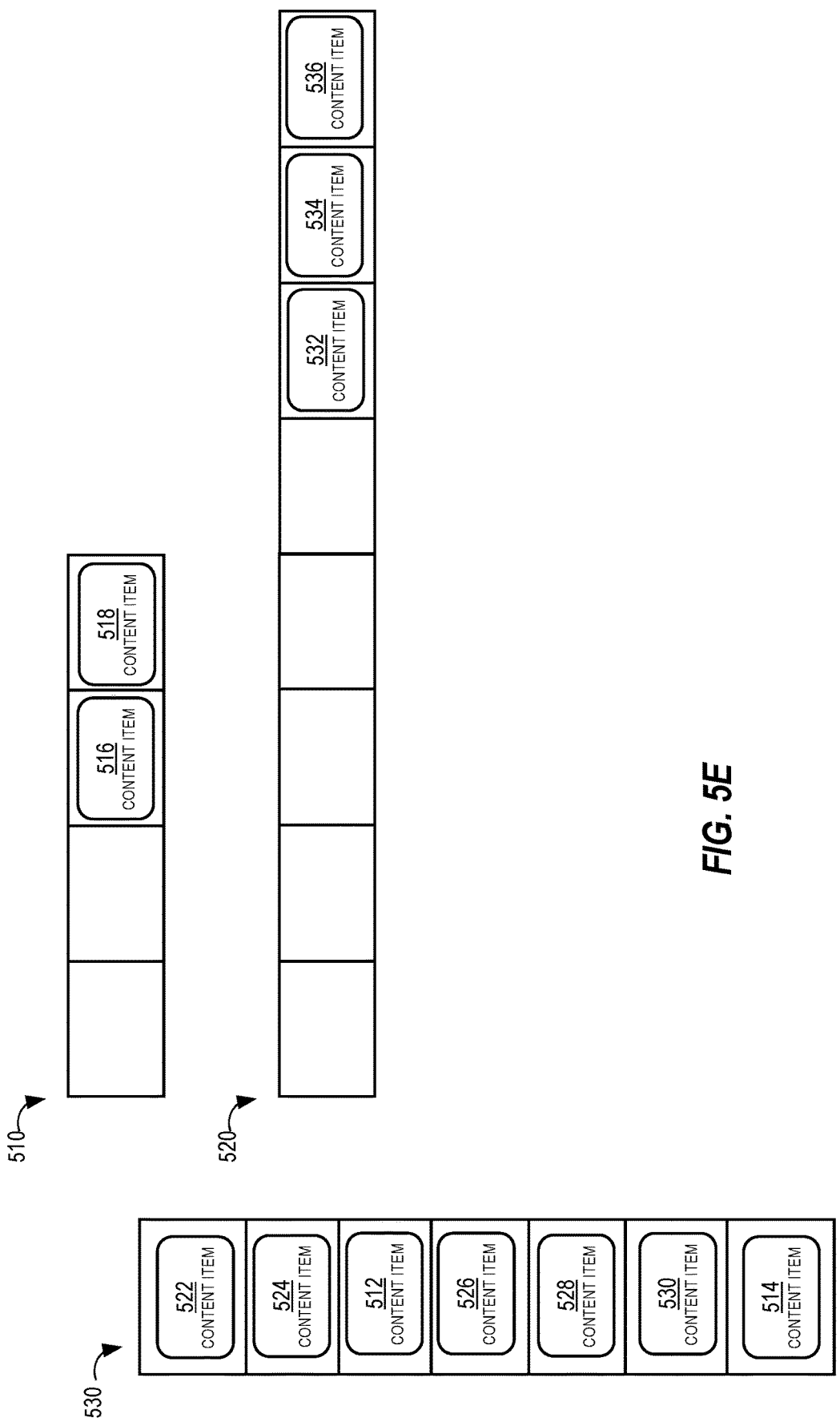

Process 400 returns to block 450 and may continue for multiple cycles. FIG. 5E is a block diagram that depicts queues 510 and 520 after another content item from queue 510 has been inserted into content item feed 530 (as a result of a second iteration of block 460) and removed from queue 510.

Process 400 may continue as long as a user scrolls through the content item feed. For example, process 400 may continue until ten slots (in the content item feed) that have not yet been displayed have been filled with content items. If the user scrolls down so that at least some of those ten slots are displayed, then process 400 may continue virtually indefinitely, or until the first queue and/or second queue are empty.

In a related embodiment, block 440 is skipped, indicating that there is no top slot parameter. In this embodiment, the current gap is presumed to be 0 (or 1) for the first slot in the content item feed. Thus, it is more likely that content items of the second type are selected for insertion into the first and second slots of the content item feed than content items of the first type.

In a related embodiment, block 470 is skipped, indicating that there is no minimum gap parameter. Thus, after block 460 (and the current slot reference is incremented by one so that it points to the next available slot), process 400 returns to block 450.

Calculating a Shadow Bid

As noted previously, a shadow bid value depends on the current gap, which is the number of slots between the last slot (in a content item feed) that contains a content item of the first type and the next available slot (or the current slot that is being considered). As the current gap increases, the shadow bid value decreases. A shadow bid value may be calculated in one of a number of ways.

For example, shadow bid value=base value*BETA^(6−current gap). The following table shows the shadow bid value for different current gap values, where base value=0.1 and BETA=7:

| CURRENT GAP | SHADOW BID VALUE |
|---|---|
| 4 | base_value * BETA^(6 − 4) = 0.1 * 7^2 = 4.9 |
| 5 | base_value * BETA^(6 − 5) = 0.1 * 7 = 0.7 |
| 6 | base_value * BETA^(6 − 6) = 0.1 * 7^0 = 0.1 |
| 7 | base_value * BETA^(6 − 7) = 0.1 * (1/7) = 0.014 |
| 8 | base_value * BETA^(6 − 8) = 0.1 * (1/49) = 0.002 |

This table starts with a current gap of 4 and ends with a current gap of 8. However, values for current gaps may be less than 4 and greater than 8. Shadow bid values do not need to be calculated for current gaps less than the minimum gap value.

For a content item of the first type to be selected for a current slot instead of a content item of another type, the eCPI (effective cost per impression or expected revenue per impression) of the content item of the first type generally should be greater than the product of the shadow bid value and the probability of engagement of the content item of the other type (because eCPI is the dominant factor in computing an overall value for content items of the first type). eCPI may be calculated by multiplying the bid amount of a content item by a predicted user selection rate.

Other formulas may be used to calculate a shadow bid value. For example, the base value and the value of BETA may be different. As another example, instead of the current gap being a component of the exponent, the current gap may be a component of a product. For example, the value of BETA may be multiplied by a value that is based on the current gap, such as "6−current gap."

Without modifying the shadow bid value based on current gap, the average gap between content items of the first type would stay the same regardless of the demand of content from publisher system 130. In other words, prior approaches handle the variability of demand (e.g., due to seasonality) poorly. Thus, using a fixed shadow bid value regardless of the current gap has almost the same results as using a fixed slot approach where content items of the first type are spaced evenly in each content item feed, regardless of the quality of the content items (e.g., reflected in a predicted user selection rate of each content item) that are being considered for insertion into each content item feed.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
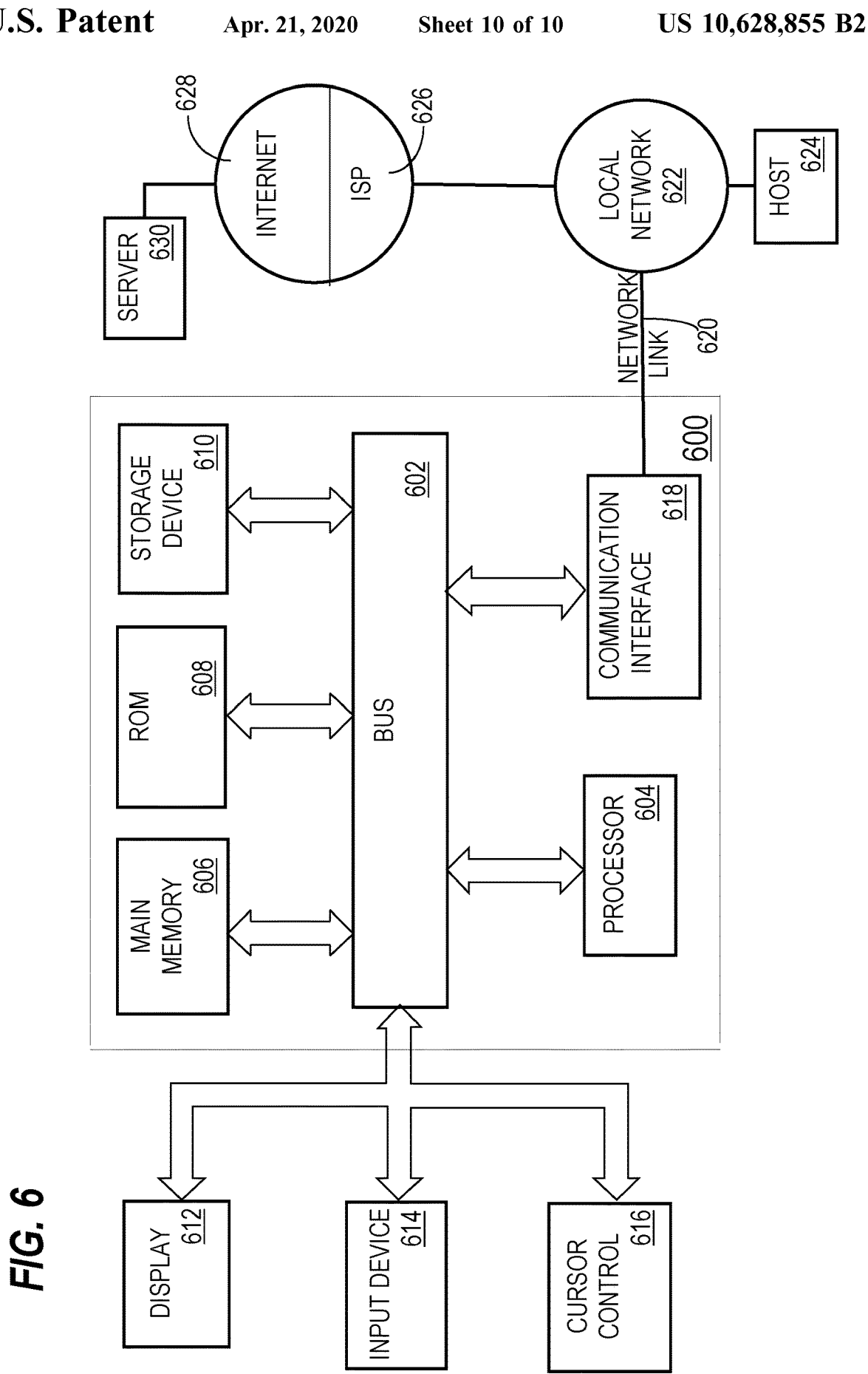
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying a first set of content items of a first type;
   identifying a second set of content items of a second type that is different than first type;
   merging the first set of content items and the second set of content items in a content item feed, wherein merging comprises, for a particular slot in the content item feed:
   determining a previous slot that contains a first content item from the first set of content items;
   determining a number of slots between the previous slot and the particular slot;
   based on the number of slots, generating a score for a second content item from the second set of content items;
   based on the score, determining whether to insert, into the particular slot, the second content item or a third content item from the first set of content items;
   wherein the method is performed by one or more computing devices.

2. The method of claim 1, further comprising:
   inserting the third content item into the particular slot and removing the third content item from the first set of content items;
   for a current slot, in the content item feed, that is subsequent to the particular slot:
   determining that a current number of slots between the most recent slot that contains a content item of the first type and the current slot;
   based on the current number of slots, calculating a second score for the second content item;
   based on the second score, determining, whether to insert, into the current slot, the second content item or a fourth content item from the first set of content items.

3. The method of claim 1, further comprising:
   inserting the second content item into the particular slot and removing the second content item from the second set of content items;
   for a current slot, in the content item feed, that is subsequent to the particular slot:

determining that a current number of slots between the most recent slot that contains a content item of the first type and the current slot;

based on the current number of slots, calculating a second score for a fourth content item from the second set of content items;

based on the second score, determining, whether to insert, into the current slot, the fourth content item or the third content item from the first set of content items.

4. The method of claim 1, further comprising:

storing a top slot value;

prior to inserting any content item from the first set of content items into the content item feed and based on the top slot value, inserting a number of content items from the second set of content items into an equal number of slots of the content item feed.

5. The method of claim 1, further comprising:

storing a minimum gap value;

after inserting the first content item into the content item feed, inserting, into one or more slots that are subsequent to the slot in which the first content item is inserted, a number of content items, from the second set of content items, that is based on the minimum gap value;

wherein the particular slot is subsequent to the one or more slots.

6. The method of claim 1, further comprising:

based on the number of slots, calculating a second score for the third content item;

wherein determining whether to insert the second content item or the third content item into the particular slot is also based on the second score.

7. The method of claim 1, further comprising:

generating a prediction of a user selection of the second content item wherein calculating the score is also based on the prediction.

8. The method of claim 1, further comprising:

generating a prediction of a user selection of the third content item;

determining a bid amount for the third content item;

calculating a second score for the third content item based on the prediction and the bid amount;

wherein determining whether to insert the second content item or the third content item into the particular slot is also based on the second score.

9. The method of claim 8, further comprising:

storing a base value, wherein calculating the second score is also based on the base value.

10. The method of claim 1, wherein the score is based on a shadow bid value that is based on the number of slots between the previous slot and the particular slot, wherein the greater the number of slots, the smaller the shadow bid value and the smaller the score.

11. A method comprising:

in response to receiving a request, determining to create a feed of content items of different types;

inserting, into a first slot of the feed, a first content item of a first type;

for a second slot of the feed, determining a number of slots between the first slot and the second slot;

based on the number of slots, calculating a first score for a second content item of a second type that is different than the first type;

calculating a second score for a third content item of the first type;

based on the first score and the second score, determining whether to insert, into the second slot, the second content item or the third content item;

wherein the method is performed by one or more computing devices.

12. One or more storage media storing instructions which, when executed by one or more processors, cause:

identifying a first set of content items of a first type;

identifying a second set of content items of a second type that is different than first type;

merging the first set of content items and the second set of content items in a content item feed, wherein merging comprises, for a particular slot in the content item feed:

determining a previous slot that contains a first content item from the first set of content items;

determining a number of slots between the previous slot and the particular slot;

based on the number of slots, generating a score for a second content item from the second set of content items;

based on the score, determining whether to insert, into the particular slot, the second content item or a third content item from the first set of content items.

13. The one or more storage media of claim 12, wherein the instructions, when executed by the one or more processors, further cause:

inserting the third content item into the particular slot and removing the third content item from the first set of content items;

for a current slot, in the content item feed, that is subsequent to the particular slot:

determining that a current number of slots between the most recent slot that contains a content item of the first type and the current slot;

based on the current number of slots, calculating a second score for the second content item;

based on the second score, determining, whether to insert, into the current slot, the second content item or a fourth content item from the first set of content items.

14. The one or more storage media of claim 12, wherein the instructions, when executed by the one or more processors, further cause:

inserting the second content item into the particular slot and removing the second content item from the second set of content items;

for a current slot, in the content item feed, that is subsequent to the particular slot:

determining that a current number of slots between the most recent slot that contains a content item of the first type and the current slot;

based on the current number of slots, calculating a second score for a fourth content item from the second set of content items;

based on the second score, determining, whether to insert, into the current slot, the fourth content item or the third content item from the first set of content items.

15. The one or more storage media of claim 12, wherein the instructions, when executed by the one or more processors, further cause:

storing a top slot value;

prior to inserting any content item from the first set of content items into the content item feed and based on the top slot value, inserting a number of content items from the second set of content items into an equal number of slots of the content item feed.

16. The one or more storage media of claim 12, wherein the instructions, when executed by the one or more processors, further cause:

storing a minimum gap value;

after inserting the first content item into the content item feed, inserting, into one or more slots that are subsequent to the slot in which the first content item is inserted, a number of content items, from the second set of content items, that is based on the minimum gap value;

wherein the particular slot is subsequent to the one or more slots.

17. The one or more storage media of claim 12, wherein the instructions, when executed by the one or more processors, further cause:

based on the number of slots, calculating a second score for the third content item;

wherein determining whether to insert the second content item or the third content item into the particular slot is also based on the second score.

18. The one or more storage media of claim 12, wherein the instructions, when executed by the one or more processors, further cause:

generating a prediction of a user selection of the second content item wherein calculating the score is also based on the prediction.

19. The one or more storage media of claim 12, wherein the instructions, when executed by the one or more processors, further cause:

generating a prediction of a user selection of the third content item;

determining a bid amount for the third content item;

calculating a second score for the third content item based on the prediction and the bid amount;

wherein determining whether to insert the second content item or the third content item into the particular slot is also based on the second score.

20. The one or more storage media of claim 12, wherein the score is based on a shadow bid value that is based on the number of slots between the previous slot and the particular slot, wherein the greater the number of slots, the smaller the shadow bid value and the smaller the score.

* * * * *